July 14, 1970  P. L. MURPHY  3,520,144
ABSORPTION REFRIGERATION SYSTEM
Filed June 7, 1968  2 Sheets-Sheet 1
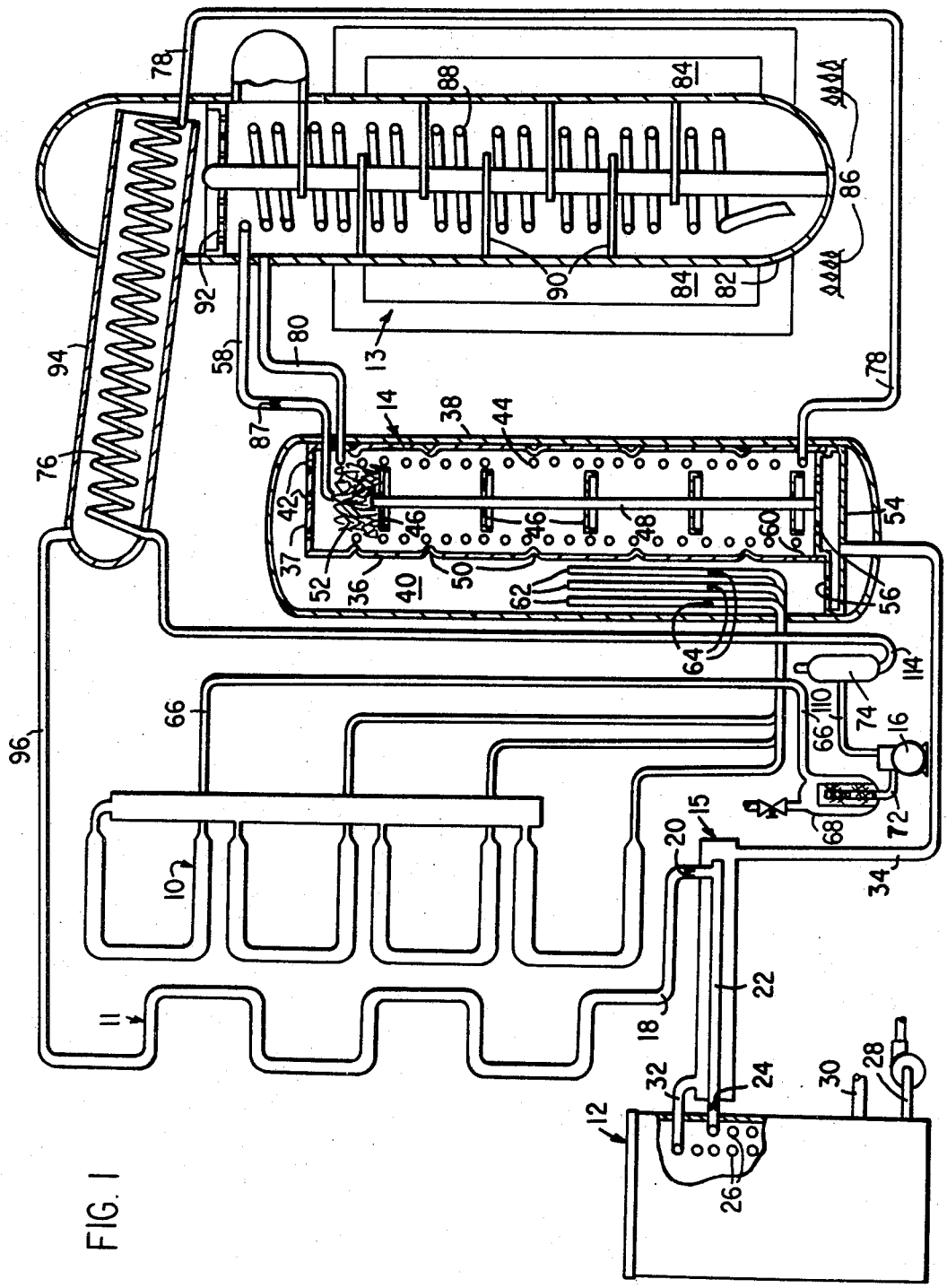
FIG. I
INVENTOR.
PATRICK L. MURPHY.
BY James E. Schardt
ATTORNEY.

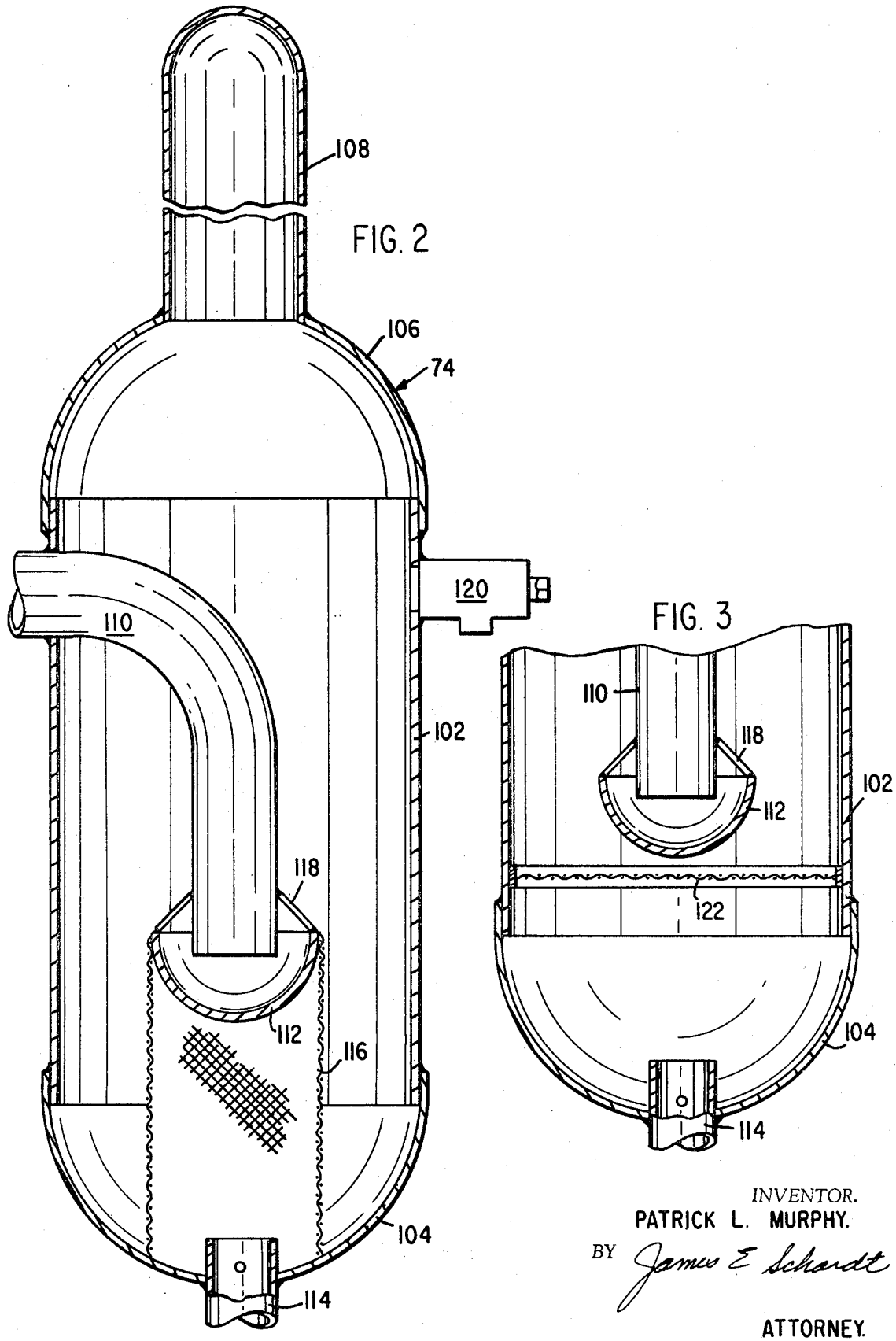

United States Patent Office 3,520,144
Patented July 14, 1970

3,520,144
ABSORPTION REFRIGERATION SYSTEM
Patrick L. Murphy, Indianapolis, Ind., assignor to Carrier Corporation, Syracuse, N.Y., a corporation of Delaware
Filed June 7, 1968, Ser. No. 735,325
Int. Cl. F25b 47/00
U.S. Cl. 62—85   5 Claims

ABSTRACT OF THE DISCLOSURE

An absorption refrigeration system employing a "pulser" type solution pump in which a pump discharge tank is provided to separate and store the noncondensibles in the system and utilize the collected noncondensibles to dampen the pump discharge pulsations.

BACKGROUND OF THE INVENTION

Absorption refrigeration systems comprising a high pressure side including a generator and a condenser, and a low pressure side including an evaporator and an absorber require a solution transfer mechanism such as a pump to transfer weak solution from the low side of the system to the high side. Ordinarily, the pressure difference across the system is large necessitating the use of a positive displacement reciprocating piston pump or a diaphragm pump; both of the aforementioned pumps however provide a pulsed output which can create excessive noise in the system.

Another problem which may arise in the operation of an absorption refrigeration system is the generation of noncondensible gases such as hydrogen which may have a detrimental effect on the performance of the system. It is therefore necessary to provide means to separate the noncondensible gases and retain them out of circulation in the system. It is difficult to separate the gases from the absorbent solution on the high pressure side of the system due to the tendency of the gas to remain suspended in the solution in the form of fine bubbles. Further, storage of the noncondensible gases on the low pressure side of the system where separation may be more readily accomplished requires an undesirably large storage tank because of the volume of gas at low pressure.

SUMMARY OF THE INVENTION

This invention relates to a pump discharge tank adapted to separate and store noncondensible gases in the system and which utilizes the stored noncondensible gases to dampen the pump pulsations to provide quieter system operation and a smooth flow of solution through the high pressure side of the system.

BRIEF DESCRIPTION OF THE DRAWINGS

FIG. 1 is a schematic flow diagram of an absorption refrigeration system;

FIG. 2 illustrates a sectional view of the preferred embodiment of the discharge tank of the present invention; and FIG. 3 is a sectional view of a second embodiment of the pump discharge tank.

DESCRIPTION OF THE PREFERRED EMBODIMENT

Referring to FIG. 1 of the drawing, there is shown a refrigeration system comprising a primary absorber 10, a condenser 11, an evaporator or chiller 12, a generator 13, a solution-cooled absorber 14 and a liquid-suction heat exchanger 15 connected to provide refrigeration. A pump 16 is employed to circulate weak absorbent solution from primary absorber 10 to generator 13. As used herein the term "weak absorbent solution" refers to a solution which is weak in absorbent power and the term "strong absorbent solution" refers to a solution which is strong in absorbent power. A suitable absorbent for use in the system described is water and a suitable refrigerant is ammonia.

Liquid refrigerant condensed in condenser 11 passes through refrigerant liquid passage 18, and refrigerant restriction 20 to heat exchange tube 22 of liquid- suction heat exchanger 15. The liquid refrigerant is cooled in tube 22 and emerges from the liquid-suction heat exchanger and passes through refrigerant restriction 24 into heat exchanger 26 in chiller 12.

A fluid medium such as water to be chilled passes over the exterior of heat exchanger 26 where it is chilled by giving up heat to evaporate refrigerant within the heat exchanger. The chilled medium passes out of the chiller 12 through line 28 to suitable remote heat exchanger (not shown) after which it is returned to the chiller through inlet 30 for rechilling.

The cold refrigerant evaporated in heat exchanger 26 passes through refrigerant vapor passage 32 and through liquid-suction heat exchanger 15 in heat exchange relation with liquid refrigerant passing through tube 22. The refrigerant vapor then passes through refrigerant vapor passage 34 into solution-cooled absorber 14.

The solution-cooled absorber 14 is formed within a tubular or cylindrical vessel 38 by a tubular, preferably, cylindrical internal baffle 36 which divides the tubular cylindrical vessel 38 into the solution-cooled absorber 14 and a second solution chamber 40. Vessel 38 is preferably closed at both ends. Baffle 36 may be provided with a top cover plate 37 having a plurality of vapor discharge apertures 42 therein to allow vapor to escape from solution-cooled absorber 14 into chamber 40.

A weak solution heat exchanger 44, preferably comprising a helical coil is disposed within solution-cooled absorber 14. A plurality of horizontal plates 46 are secured to a central support 48 and arranged within baffle 36 to cooperate with annular grooves 50 and heat exchanger 44 to provide a tortuous path for passage of vapor and solution through solution-cooled absorber 14. Suitable packing such as Raschig rings 52 may fill the space between the uppermost plate 46 and the top of the solution-cooled absorber to reduce the tendency of solution froth to escape through discharge apertures 42.

A refrigerant vapor distributor header 54 is secured to close the bottom of baffle 36. Header 54 is provided with refrigerant vapor ports 56 for passage of refrigerant vapor from line 34 into solution-cooled absorber 14 and chamber 40. Strong solution from generator 13 is supplied to the top portion of solution-cooled absorber 14 through line 58. The strong solution passes downwardly through the solution-cooled absorber in counterflow relation to upwardly passing refrigerant vapor and weak solution passing through coil 44. A strong solution discharge passage 60 is provided adjacent the lower portion of baffle 36 for passage of solution from the solution-cooled absorber into chamber 40.

Solution discharge passages 62 are provided for passing a mixture of refrigerant vapor and solution from chamber 40 to primary absorber 10. Each of the discharge passages comprises a tubular member having an upper open end for admission of vapor and a solution inlet aperture 64 which is disposed below the level of absorbent solution in chamber 40. This insures a mixed flow of liquid and vapor to the primary absorber.

A cooling medium, preferably ambient air, is passed through the primary absorber 10 in heat exchange relation with the absorbent solution to cool the absorbent solution to promote the absorption of the refrigerant vapor in the absorber. The same cooling medium may be supplied to condenser 11 in heat exchange relation with refrigerant therein to condense the refrigerant.

Cold weak absorbent solution passes from primary absorber 10 through line 66 into pump inlet tank 68. Weak solution from inlet tank 68 is supplied to weak solution pump 16 through line 72. Liquid from pump 16 passes through pump discharge tank 74 to a rectifier heat exchange coil 76. From coil 76, the weak solution passes through line 78 to weak solution heat exchanger 44 in solution-cooled absorber 14. The weak solution from coil 44 passes through line 80 into the upper portion of generator 13 along with any vapor formed in coil 44.

Generator 13 comprises a shell 82 having fins 84 suitably affixed thereto as by welding. The generator is heated by a gas burner 86 or other suitable heating means. The weak solution is boiled in generator 13 to concentrate the solution, thereby forming a strong solution and refrigerant vapor.

The hot strong absorbent solution passes upwardly through the analyzer section of generator 13 through analyzer coil 88 in heat exchange with weak solution passing downwardly over the coil. The warm strong solution passing through line 58 which has solution restrictor 87 therein and is discharged into the upper portion of solution-cooled absorber 14.

Refrigerant vapor formed in generator 13 passes upwardly through the analyzer section thereof where it is concentrated by mass heat transfer with weak solution passing downwardly over analyzer coil 88. Analyzer plates 90 in generator 13 provide a toruous path for flow of solution and vapor to assure intimate contact therebetween to improve the mass heat transfer. The refrigerant vapor from the analyzer section passes through reflux plate 92 in heat exchange relation with absorbent condensed in rectifier 94. The vapor then passes through rectifier 94 in heat exchange relation with rectifier heat exchange coil 76. Absorbent condensed in rectifier 94 flows downwardly onto plate 92 where it is heated by the refrigerant vapor passing therethrough. The heated absorbent is then passed to the generator along with the weak solution discharged into the generator from line 80. Refrigerant vapor passes from rectifier 94 through line 96 to condenser 11 to complete the refrigeration cycle.

The pump discharge tank 74, as illustrated in FIG. 2, includes a cylindrical portion 102, a hemispherically shaped bottom portion 104 and a hemispherically shaped top portion 106. A small diameter cylindrical extension 108 is suitably affixed to top portion 106 of the discharge tank for reasons to be hereinafter explained. A pump discharge line 110 is adapted to discharge high pressure weak solution into cup-shaped deflector 112 to direct the weak solution in an upward direction. Tank outlet line 114 communicates with rectifier heat exchange coil 76 to provide high pressure weak solution thereto. A cylindrical screening element 116 is provided to filter the weak solution passing to rectifier heat exchange coil 76 and to trap the noncondensible bubbles dispersed in the weak solution. Suitable supports 118 are provided to position deflector 112 adjacent the end of pump discharge line 110. A bleed valve 120 is provided to bleed excess noncondensible gas from discharge tank 74.

FIG. 3 illustrates a second embodiment of my invention which is similar to the embodiment illustrated in FIG. 2 except for the shape and location of the screening element 122.

Weak solution having noncondensible gases dispersed therein in the form of minute bubbles is discharged into deflector 112 of the discharge tank 74, causing the solution to be deflected upwardly so that it must undergo a change in direction before collecting at the bottom of tank 74. By subjecting the solution to the aforementioned flow pattern, a large proportion of the noncondensible gases is separated from the solution, the separated gases collecting in cylindrical extension 108 and top portion 106 of the discharge tank. The noncondensible gas bubbles that remain in the weak solution collect on screens 116 or 122 where they combine with each other until large enough bubbles are formed to rise to the surface of the collected weak solution.

The cylindrical extension 108 serves a double purpose in the collection and storage of noncondensible gases. By discharging the weak solution in an upward direction in the tank, turbulence is created in the upper portion of the large diameter section of the tank. By storing a large proportion of the gases in extension 108 above the turbulent area in the discharge tank, readsorption of the gas in the weak solution sprayed upwardly in the tank is minimized. By providing a small diameter gas storage area, the interface between the collected gases and the gas separation area which contains a mist of weak solution due to the action of deflector 112 is minimized. The small area of the interface reduces reabsorption of gas into the weak solution.

After a period of machine operation, a large quantity of noncondensible gases may have formed within the machine and collected in tank 74. The collected gases will occupy the top portion of tank 74 down to a location below valve 120. Periodically, valve 120 my be opened to bleed noncondensible gases from the tank. When sufficient gases have been bled therefrom so that weak solution in the tank flows out valve 120, the valve is closed. The amount of noncondensible gases then remaining in the tank above the level of valve 120 is that quantity of gas which is necessary to dampen the pulsations of the solution transfer pump. The loation of valve 120 therefore provides a means for periodically bleeding noncondensibles from the system while maintaining a proper minimum quantity of noncondensible gases therein.

While I have described a preferred embodiment of my invention, it is to be understood that the invention is not limited thereto but may be otherwise embodied within the scope of the following claims.

I claim:
1. A method for collecting and storing noncondensible gases on the high pressure side of an absorption refrigeration system including the steps of:
   discharging high pressure weak solution having minute bubble of noncondensible gases therein in a downward direction in a storage tank;
   deflecting the discharged solution in an upward direction to separate additional quantities of the bubbles entrained therein;
   collecting the weak solution at the bottom of the tank for passage to the generator of the absorption machine; and
   collecting and storing the noncondensible gases removed from the weak solution at the top of the tank.
2. The method for collecting and storing noncondensible gases in the high pressure side of an absorption refrigeration system according to claim 1 further including the steps of:
   passing the collected weak solution through suitable straining means at the bottom of the tank to collect noncondensible gas bubbles on the surface thereof, smaller gas bubbles collecting on the straining means to form larger bubbles; and
   permitting the larger bubbles to flow upwardly through the weak solution to the collected gases at the top of the tank.
3. An absorption refrigeration system comprising an absorber, a generator, a condenser, and an evaporator, the evaporator and absorber forming a low side of the system and the generator and condenser forming a high side of the system, pump means for transferring solution from the low side of the system to the high side of the system ,and a pump discharge tank for separating and storing noncondensible gases from the weak solution supplied thereto and for dampening pump pulsations, said discharge tank comprising an upper portion having a small cross sectional area relative to the volume of said tank for storing noncondensible gases, a downwardly directed inlet line for discharging weak solution from the pump means within the tank, a deflector disposed opposite the end of said inlet line to direct the solution discharged therefrom in an upward direction, and a discharge line communicating with the bottom portion of said tank for flow of weak solution from the bottom of said tank to said generator.

4. An absorption refrigeration system according to claim 3 wherein said discharge tank includes straining means disposed between said deflector and said discharge line for collecting minute bubbles of noncondensible gases remaining in the weak solution.

5. An absorption refrigeration system according to claim 4 including a bleed valve communicating with said tank at a location corresponding to the minimum volume of collected noncondensible gases necessary to cushion pulsations created by said pump means, said valve serving to bleed excess gases from said tank.

References Cited
UNITED STATES PATENTS

| | | | |
|---|---|---|---|
| 3,358,465 | 12/1967 | Russell | 62—475 X |
| 3,410,106 | 11/1968 | Brockie | 62—195 |

LLOYD L. KING, Primary Examiner

U.S. Cl. X.R.

62—101, 475, 476